UNITED STATES PATENT OFFICE.

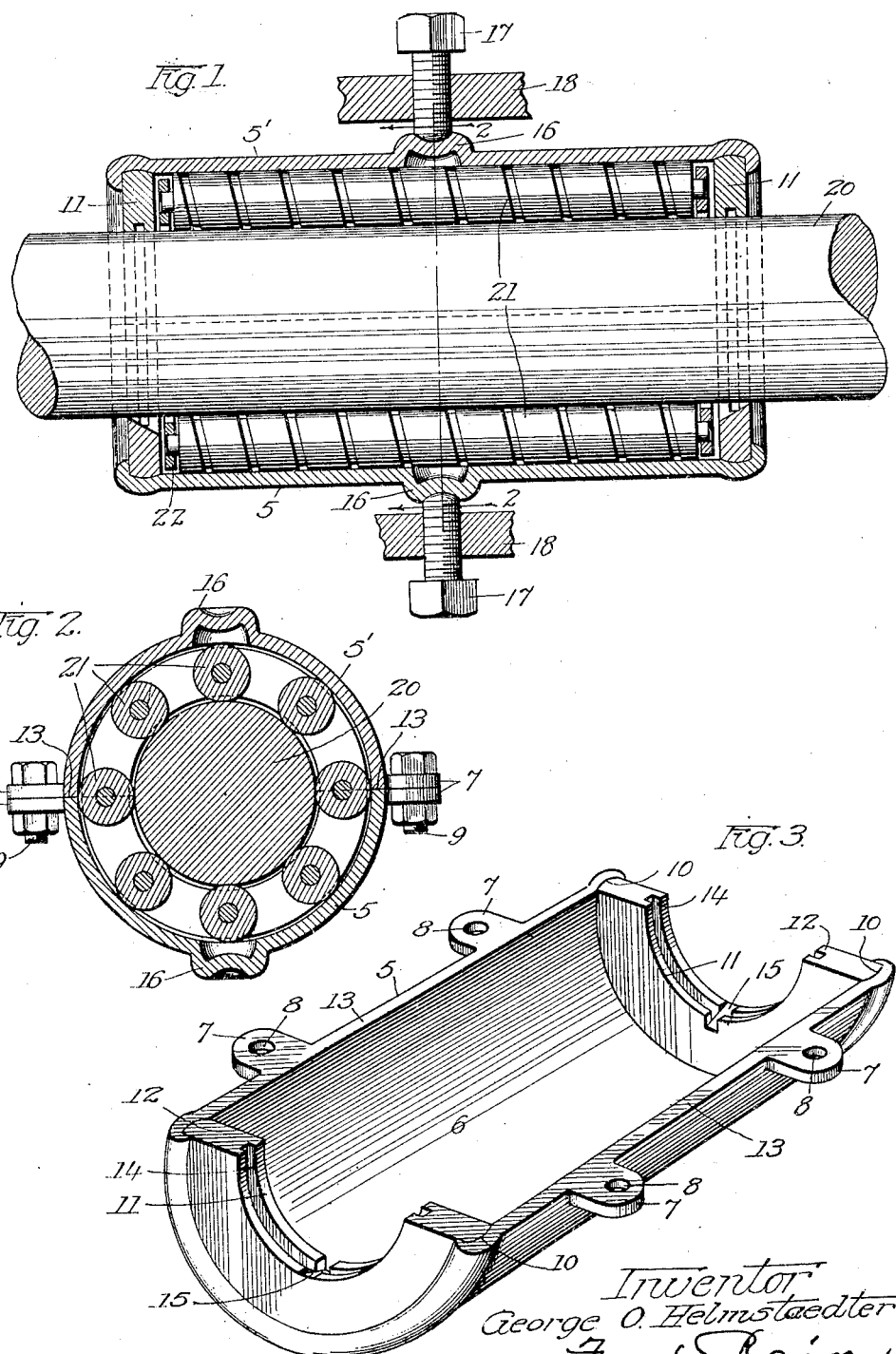

GEORGE O. HELMSTAEDTER, OF CHICAGO, ILLINOIS.

BEARING-BOX.

1,358,444.

Specification of Letters Patent.

Patented Nov. 9, 1920.

Application filed May 29, 1919. Serial No. 300,723.

*To all whom it may concern:*

Be it known that I, GEORGE O. HELMSTAEDTER, a citizen of the United States, residing at Chicago, in the county of Cook and State of Illinois, have invented certain new and useful Improvements in Bearing-Boxes, of which the following is a specification.

The invention relates to improvements in bearing boxes especially adaptable for line shafts.

One of the objects of the invention is to provide a two part roller-bearing box-member to receive a series of bearing rollers, substantially spaced apart and held in an appropriate cage.

The invention is concerned particularly with the box or housing member as an article of manufacture which presents material advantages over similar prior structures as will hereinafter appear.

In the drawings:

Figure 1 shows a central longitudinal section of the device.

Fig. 2 is a transverse section taken on line 2—2 of Fig. 1.

Fig. 3 is an isometric perspective view of one-half of the roller housing or box.

In all of the views the same reference characters are employed to indicate similar parts.

Housings for boxes of the character herein disclosed are usually made of iron, cast into suitable shape. The casings are essentially heavy, are relatively fragile and being of relatively soft metal, they essentially require a hardened inter-liner. This adds to the expense and weight of the already excessively heavy structure and materially increases its expense.

In carrying my invention into effect, I make the two part box member of sheet steel by forming it properly in a die. I then secure, in each end, a suitable crescent-shaped head and then case harden or otherwise temper the inner surface of the member to provide the required refractory surface upon which the rollers track.

In the embodiment illustrated, 5 is a sheet metal box member, substantially semi-circular in cross section, of which there are two, 5 and 5', required to form a completed box structure, and which, for reasons of convenience of manufacture, are duplicates in every essential respect.

The box member is formed into semi-cylindrical form, as at 6, with outstanding ears 7 at its longitudinal edges, each being perforated, as at 8, to receive bolts 9 to hold them together.

The part 6 is preferably formed with a semi-annular groove 10 in its ends to receive the crescent shaped heads 11. The heads are placed in the grooves with their diametric surfaces 12 preferably flush with the longitudinal surfaces 13 of the part 6, so that when the bolts 9 are placed in the perforations 8, when the two parts are together, as shown in Fig. 2, the joint will be substantially devoid of a separating gap.

The heads 11 are, preferably, welded or brazed to the body part 6 to prevent oil from leaking from the box and to render the structure stronger. The heads are provided with registering grooves 14 to catch any oil that may tend to crawl out on the shaft and notches 15 that intercept the grooves to lead the oil back into the box. Each member 5 and 5' is provided with screw-receiving indents 16 for screws 17 that are threaded in the box supporting member 18. The screws engage the members at diametrically opposite points and permit the box to slightly swivel while firmly supporting it.

The box members are applied to the shaft 20 and subsequently fastened together with the screws 9.

The invention is not particularly directed to the rollers 21 and the containing cage 22. Any suitable form of such devices may be used in my improved bearing box.

While I have herein specifically shown and described one embodiment of my invention, it is manifest that variation therefrom is permissible within the scope of the appended claims.

Having described my invention, what I claim is:—

1. A bearing box comprising a sheet metal, split shell providing a receiving groove (10) in the ends of each part; a crescent shaped head (11) in each groove held in place by the means that holds the two parts of the shell together and prevented from moving thereby.

2. A bearing box comprising two semi-cylindrical sheet metal parts having their ends bent to retain end heads when the parts are held together and segment-shaped heads, one in each end, each head having a circumferential groove in its bore to contain a lubricant and a drain notch in the lower segment opening into the lower shell part.

In testimony whereof I hereunto subscribed my name.

GEORGE O. HELMSTAEDTER.